(12) United States Patent
Gao et al.

(10) Patent No.: US 10,101,929 B2
(45) Date of Patent: Oct. 16, 2018

(54) MAINTAINING DATA CONSISTENCY

(71) Applicant: EMC Corporation, Hopkinton, MA (US)

(72) Inventors: Jian Gao, Beijing (CN); Hongpo Gao, Beijing (CN); Xinlei Xu, Beijing (CN); Huibing Xiao, Beijing (CN); Geng Han, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 37 days.

(21) Appl. No.: 15/263,763

(22) Filed: Sep. 13, 2016

(65) Prior Publication Data
US 2017/0075602 A1 Mar. 16, 2017

(30) Foreign Application Priority Data
Sep. 15, 2015 (CN) .......................... 2015 1 0587474

(51) Int. Cl.
*G06F 3/06* (2006.01)
(52) U.S. Cl.
CPC ............ *G06F 3/0619* (2013.01); *G06F 3/065* (2013.01); *G06F 3/0634* (2013.01); *G06F 3/0683* (2013.01); *G06F 3/0689* (2013.01)

(58) Field of Classification Search
CPC .... G06F 3/0689; G06F 3/0619; G06F 3/0634; G06F 3/0683; G06F 3/065
USPC ........................................................ 711/156
See application file for complete search history.

(56) References Cited

U.S. PATENT DOCUMENTS

| 9,386,043 B2 * | 7/2016 | Legacy ................... H04L 67/10 |
| 2011/0197011 A1 * | 8/2011 | Suzuki .................. G06F 3/0607 710/316 |

* cited by examiner

*Primary Examiner* — Jasmine Song
(74) *Attorney, Agent, or Firm* — Krishnendu Gupta; Konrad R. Lee

(57) ABSTRACT

Embodiments of the present disclosure provide a method and apparatus of maintaining data consistency by receiving, when a first storage processor is in a Ready state, a request for configuration information of a storage object from a second storage processor; in response to receiving the request, setting the first storage processor to an Updating-Peer state, and sending the configuration information to the second storage processor to maintain consistency of the configuration information in the first and second storage processors; and in response to the configuration information being sent, setting the first storage processor back to the Ready state.

8 Claims, 9 Drawing Sheets

MAINTAINING DATA CONSISTENCY

RELATED APPLICATION

This application claim priority from Chinese Patent Application Number CN201510587474.5, filed on Sep. 15, 2015 at the State Intellectual Property Office, China, titled "METHOD AND APPARATUS OF MAINTAINING DATA CONSISTENCY," the contents of which is herein incorporated by reference in entirety,

FIELD OF THE INVENTION

Embodiments of the present disclosure generally relate to ensuring data consistency.

BACKGROUND OF THE INVENTION

Computer systems are constantly improving in terms of speed, reliability, and processing capability. As is known in the art, computer systems which process and store large amounts of data typically include a one or more processors in communication with a shared data storage system in which the data is stored. The data storage system may include one or more storage devices, usually of a fairly robust nature and useful for storage spanning various temporal requirements, e.g., disk drives. The one or more processors perform their respective operations using the storage system. Mass storage systems (MSS) typically include an array of a plurality of disks with on-board intelligent and communications electronics and software for making the data on the disks available.

Companies that sell data storage systems are very concerned with providing customers with an efficient data storage solution that minimizes cost while meeting customer data storage needs. It would be beneficial for such companies to have a way for reducing the complexity of implementing data storage.

SUMMARY OF THE INVENTION

Objectives of embodiments of the present disclosure provide a method and an apparatus of maintaining data consistency between copies of configurations in SPs and shared disk arrays. Embodiments of the present disclosure related to an apparatus and a method of maintaining data consistency, that includes: receiving, when a first storage processor is in a Ready state, a request for configuration information of a storage object from a second storage processor; in response to receiving the request, setting the first storage processor to an Updating-Peer state, and sending the configuration information to the second storage processor to maintain consistency of the configuration information in the first and second storage processors; and in response to the configuration information being sent, setting the first storage processor back to the Ready state. Other embodiments are also disclosed.

BRIEF DESCRIPTION OF THE DRAWINGS

The above and other objectives, features and advantages of the embodiments of the present disclosure will become easily understood by reading the detailed depiction below with reference to the accompanying drawings. Several embodiments of the present disclosure are illustrated in an exemplary, but not limitative, manner in the drawings, in which.

Throughout the drawings, the same or corresponding reference numerals represent the same or corresponding parts.

DETAILED DESCRIPTION OF THE PREFERRED EMBODIMENTS

Exemplary embodiments of the present disclosure will be described in detail with reference to figures. The flowcharts and block diagrams in the figures illustrate system architecture, functions and operations executable by a method and system according to the embodiments of the present disclosure. It should be appreciated that each block in the flowcharts or block diagrams may represent a module, a program segment, or a part of code, which contains one or more executable instructions for performing specified logic functions. It should also be noted that, in some alternative implementations, the functions noted in the block may occur out of the order noted in the figures. For example, two blocks shown consecutively may be performed in parallel substantially or in an inverse order, depending on involved functions. It should also be noted that each block in the block diagrams and/or flow charts and a combination of blocks in block diagrams and/or flow charts may be implemented by a dedicated hardware-based system for executing a prescribed function or operation or may be implemented by a combination of dedicated hardware and computer instructions.

The terms "comprising", "including" and their variants used herein should be understood as open terms, i.e., "comprising/including, but not limited to". The term "based on" means "at least partly based on". The term "an embodiment" represents "at least one embodiment"; the terms "another embodiment" and "a further embodiment" represent "at least one additional embodiment". Relevant definitions of other terms will be given in the description below.

Figure 1:
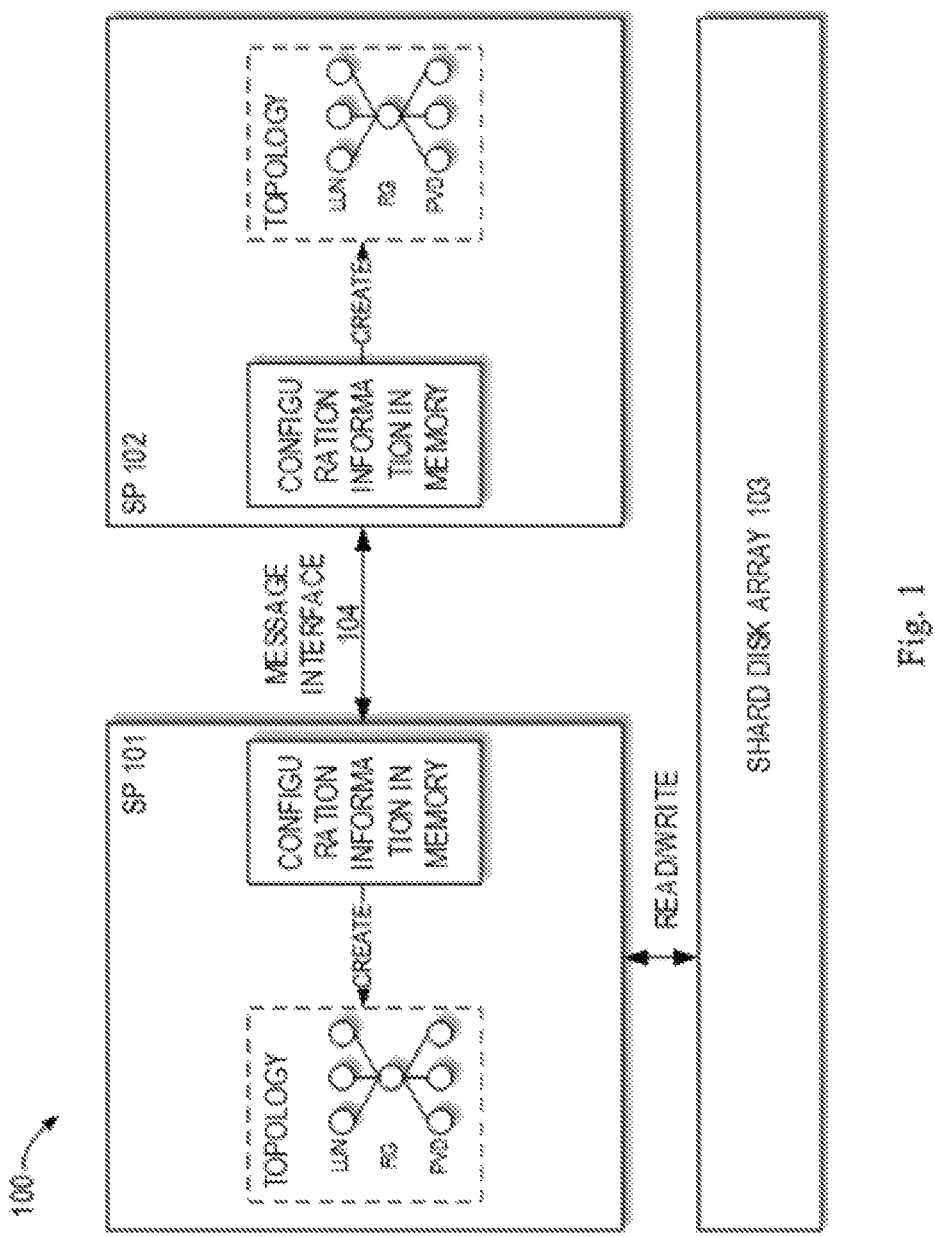
FIG. 1 illustrates an exemplary architecture diagram of a storage system 100 having two storage processors that share a disk array.

Generally, in popular storage products, an architecture where a plurality of storage processors (SP, also referred to as processing nodes) are attached to a shared disk array is usually employed to enhance computing power and input and output (IO) throughput of the storage products. In an example embodiment, FIG. 1 shows an architecture diagram of storage system 100 having two storage processors sharing a disk array. As shown in FIG. 1, in the storage system architecture, topology services may be defined and implemented to manage RAID Group (RG) objects, logic unit number (LUN) objects, and Provision Visual Disk (PVD) objects, where RG objects may be used to implement a RAID algorithm, LUN objects are used to export a region of RG to an upper layer, while PVD objects are used to abstract some common disk attributes from different disks provided by vendors. As shown in FIG. 1, in order to manage configurations of RG/LUN/PVD, a Database Service may be introduced, which may need to cache data entries for configurations of RG/LUN/PVD on both SP 101 and SP 102, and meanwhile may also need to write configurations to shared disk array 103. With persistent configurations in shared disk array 103, SP 101 and SP 102 may load configurations of RG/LUN/PVD from shared disk array 103 upon the system booting up.

However, because the storage system architecture in FIG. 1 adopts two SPs (i.e., SP 101 and SP 102 in FIG. 1), configurations of RG/LUN/PVD may be cached in the two SPs, and configurations may also be stored in shared disk array 103, with a challenge of ensuring data consistency in such an architecture.

In one embodiment, there is provided a method of maintaining data consistency. A further embodiment may include receiving, when a first storage processor is in a Ready state, a request for configuration information of a storage object from a second storage processor. A further embodiment may include in response to receiving a request, setting a first storage processor to an Updating-Peer state, and sending configuration information to a second storage processor to maintain consistency of a configuration information in a first and second storage processors. A further embodiment may include in response to configuration information being sent, setting a first storage processor back to a Ready state.

In a further embodiment, the method may include: reading, by a first storage processor, configuration information from a shared storage device. A further embodiment may include creating a topology of a storage object corresponding to a configuration information. A further embodiment may include in response to a topology being created, setting a first storage processor to a Ready state.

In a further embodiment, the method may further include: in response to receiving a request for changing configuration information after a first storage processor is set back to a ready state, initiating a transaction for changing the configuration information by a first storage processor. A further embodiment may include sending a request for joining a transaction to a second storage processor. In a further embodiment, the method may further include: changing a first copy of a configuration information in a first memory of a first storage processor. A further embodiment may include adding a changed configuration information to a transaction. A further embodiment may include sending to a second storage processor a request for changing a second copy of a configuration information in a second memory of a second storage processor.

In a further embodiment, the method may further include: requesting, by a first storage processor, an identifier for a changed configuration information from a shared storage device, the identifier indicating a position of a configuration information stored in a shared storage device. A further embodiment may include providing the identifier to the second storage processor. In a further embodiment, the method may further include: writing a changed configuration information to a shared storage device by committing a transaction to maintain consistency of the configuration information in a first storage processor, a second storage processor and a shared storage device. In a further embodiment, the method may further include: in response to completing a commission of a transaction, invalidating a transaction by a first storage processor. A further embodiment may include sending a request for invalidating a transaction to a second storage processor.

According to one embodiment, there is provided a method of maintaining data consistency that may include: sending a request for configuration information of a storage object to a first storage processor when a second storage processor is in a Waiting-for-Configuration state. A further embodiment may include receiving configuration information from a first storage processor, and configuration information in a second storage processor being maintained consistent with the configuration information in the first storage processor.

In a further embodiment, the method may further include: in response to receiving configuration information, creating a topology of storage object corresponding to the configuration information. A further embodiment may include in response to a topology being created, setting a second storage processor to a Ready state. In a further embodiment, the method may further include: when a second storage processor is in a Ready state, receiving from a first storage processor a request for joining a transaction, the transaction being used to change the configuration information. A further embodiment may include in response to receiving a request, joining a transaction.

In a further embodiment, the method may further include: receiving, from a first storage processor, a request for changing a copy of a configuration information within a memory of a second storage processor. A further embodiment may include in response to receiving the request, changing the copy. In a further embodiment, the method may further include: receiving, from a first storage processor, an identifier for a changed configuration information, the identifier indicating a position of the changed configuration information stored in a shared storage device. In a further embodiment, the method may further include: receiving, from a first storage processor, a request for invalidating a transaction. A further embodiment may include in response to receiving a request, invalidating a transaction. In a further embodiment, the method may further include: in response to determining that a first storage processor has no response, acting as a role of a first storage processor by a second processor.

According to one embodiment, there is provided an apparatus of maintaining data consistency that may include: a request receiving module configured to receive, when the apparatus is in a Ready state, a request for configuration information of a storage object from a second storage processor. A further embodiment may include a request response module configured to, in response to receiving a request, set the apparatus to an Updating-Peer state, and send configuration information to a second storage processor to maintain consistency of the configuration information in the apparatus and the second storage processor. A further embodiment may include a first state setting module configured to, in response to configuration information being sent, set a state back to a Ready state.

In a further embodiment, the apparatus may further include: a configuration reading module configured to read configuration information from a shared storage device. A further embodiment may include a topology creating module configured to create a topology of a storage object corresponding to a configuration information. A further embodiment may include a second state setting module configured to, in response to a topology being created, set a first storage processor to a Ready state. In a further embodiment, the apparatus may further include: a transaction initiating module configured to, in response to receiving a request for changing configuration information after a first storage processor is set back to a ready state, initiate a transaction for changing a configuration information. A further embodiment may include a first request sending module configured to send a request for joining in a transaction to a second storage processor.

In a further embodiment, the apparatus may further include: a configuration changing module configured to change a first copy of a configuration information in a first memory of the apparatus. A further embodiment may include a transaction adding module configured to add a changed configuration information to a transaction. A further embodiment may include a second request sending module configured to send to a second storage processor a request for changing a second copy of a configuration information in a second memory of a second storage processor. In a further embodiment, the apparatus may further include: an identifier-requesting module configure to request an identifier for the changed configuration information from a shared storage device, the identifier indicating a position of a configuration information stored in a shared storage device. A further embodiment may include an identifier providing module configured to provide an identifier to a second storage processor.

In a further embodiment, the apparatus may further include: a transaction committing module configured to write a changed configuration information to a shared storage device by committing a transaction to maintain consistency of a configuration information in the apparatus, a second storage processor, and a shared storage device. In a further embodiment, the apparatus may further include: a transaction invalidating module configured to in response to completing a commission of a transaction, invalidate the transaction. A further embodiment may include a third request sending module configured to send a request for invalidating a transaction to a second storage processor.

According to one embodiment, there is provided an apparatus of maintaining data consistency that may include: a fourth request sending module configured to send a request for configuration information to a first storage processor when the apparatus is in a Waiting-for-Configuration state. A further embodiment may include a configuration receiving module configured to receive configuration information from a first storage processor, the configuration information in the apparatus being maintained consistent with the configuration information in a first storage processor.

One embodiment may include a computer program product of maintaining data consistency, the computer program being tangibly stored on a non-transient computer-readable medium and comprising machine-executable instructions that, when being executed, causes a machine to execute steps of the method disclosed above.

Embodiments of the present disclosure can be implemented in an architecture that may have one or more storage processors and a shared storage device so as to ensure data consistency between copies of the data in the one or more storage processors and the shared storage device.

As discussed above, FIG. 1 shows a storage system 100 having two storage processors that share a disk array. In the storage system 100, there are two SPs that have a shared disk array 103, i.e., SP 101 and SP 102. The two SPs may interact with each other via message interface 104. In certain embodiments, during bootstrapping of SPs, the two SPs determine their own roles by handshaking. In certain other embodiments, generally, the SP that boots up first is used as an active SP (also referred to as the first SP), while the other SP is used as a passive SP (also referred to as the second SP). For ease of depiction, SP 101 is referred to as the active SP, i.e., the first SP; while SP 102 is referred to as the passive SP, i.e., the second SP. According to embodiments of the present disclosure, in order to ensure consistency of copies of configuration information in SP 101 and SP 102 as well as in shared disk array 103, the passive SP needs to request configuration information from the active SP. The SPs (e.g., the topology services therein) may use the configuration information to create a topology of a storage object (e.g., RG/LUN/PVD).

Besides, according to embodiments of the present disclosure, a database service state of the SP is defined to track a life cycle of the Database Service. In a further embodiment, a database service state is mainly used for controlling and managing synchronization between SP 101 and SP 102 with respect to the configuration information. In a further embodiment, a database service state includes: an Initializing state, a Ready state, an Updating-Peer state, a Waiting-for-Configuration state, and a Failure State. In an example embodiment, a database service uses a Ready state to notify other components that it is ready for serving a configuration change. In a further embodiment, during updating a configuration to a passive SP (i.e., SP 102), a database service state of an active SP (i.e., the SP 101) may be changed to an Updating-Peer state. In a further embodiment, when a database service state is not a Ready state, it may not be allowed to change a configuration. In a further embodiment, during a period when SP 101 sends configuration information to SP 102, it may not be allowed to change a configuration, such that data inconsistency between copies of the configuration information in SP 101, SP 102 and shared disk array 103 may not occur.

Figure 2:
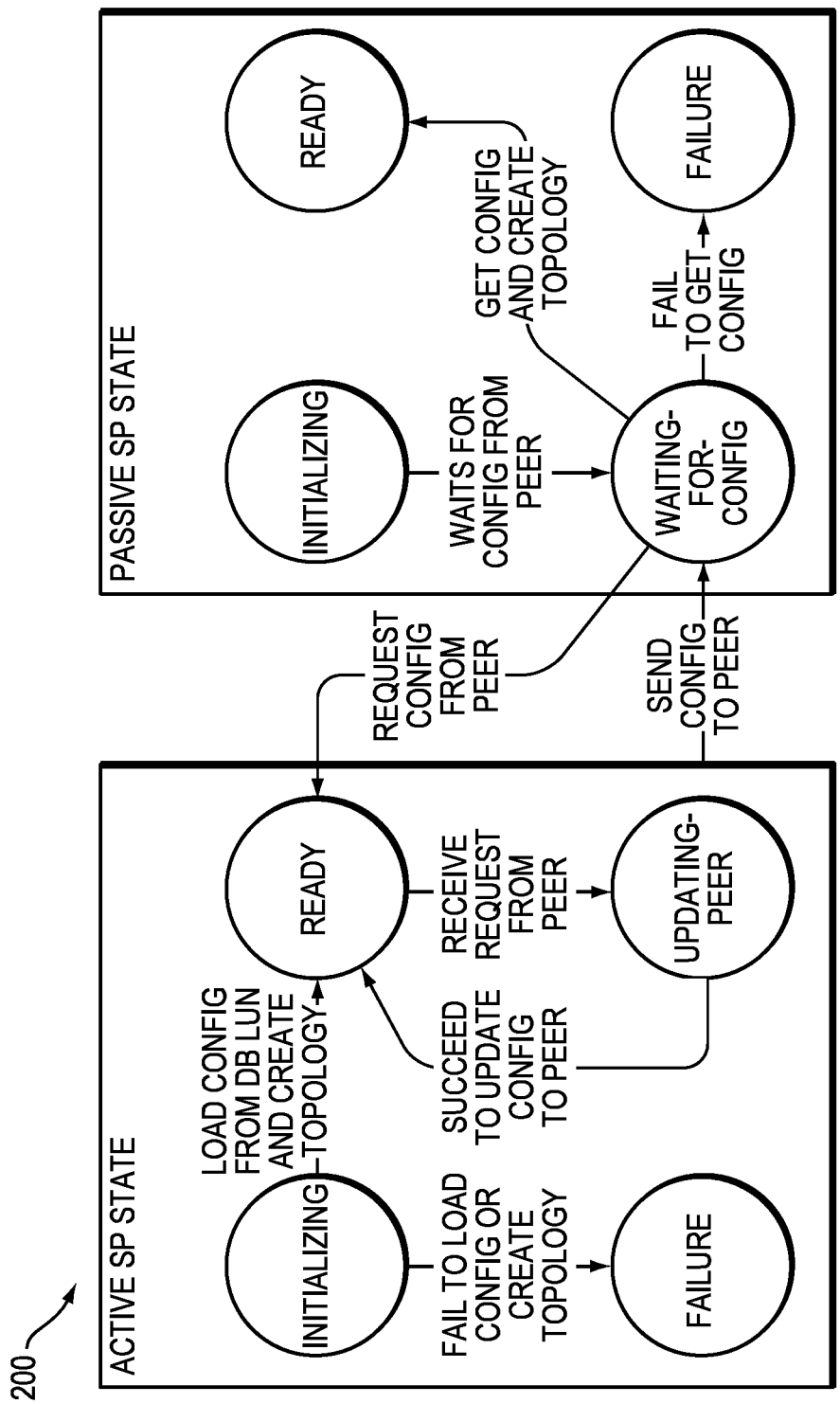
FIG. 2 illustrates a schematic diagram of state switch between the two storage processors according to an exemplary embodiment of the present disclosure.

FIG. 2 illustrates a schematic diagram of state switch between two storage processors according to embodiments of the present disclosure. Hereinafter, a state switch between an active SP (e.g., SP 101 in FIG. 1) and a passive SP (e.g., SP 102 in FIG. 2) in FIG. 2 will be described with reference to FIG. 1. When a Database Service of the active SP starts to be initialized, its state is an Initializing state. Then, the Database Service of an active SP will load configuration information from a shared disk array (e.g., shared disk array 103 in FIG. 1). If the loading fails, the database service state of the active SP changes to a Failure State; if the loading succeeds and a topology service of the active SP successfully creates the topology of a storage object with a configuration information, the database service state of the active SP becomes a Ready state. If the passive SP successfully boots up after the active SP, then the Database Service of the active SP will receive, after entering in the Ready state, a request for sending configuration to a peer. The database service state of the active SP will change to an Updating-Peer state and send a configuration information loaded from a shared disk array to the passive SP. After the configuration information is successfully sent, the active SP will change back to the Ready state. For the passive SP, the passive SP initially sets itself to the Initializing state and performs some resource initialization work. Then, the passive SP will set itself to a Waiting-for-Configuration state and sends a configuration request to the active SP via a message interface (e.g., message interface in FIG. 1) and waits for the configuration information from the active SP till the active SP sends the configuration information to it or the active SP is found to have no response. If the configuration information is not received or incomplete configuration information is obtained, then the passive SP sets its own state to be a Failure state. If all of the configuration information is received from the active SP, then the passive SP creates a topology of the storage object based on the configuration information and sets its database service state to be the Ready state.

Figure 3:
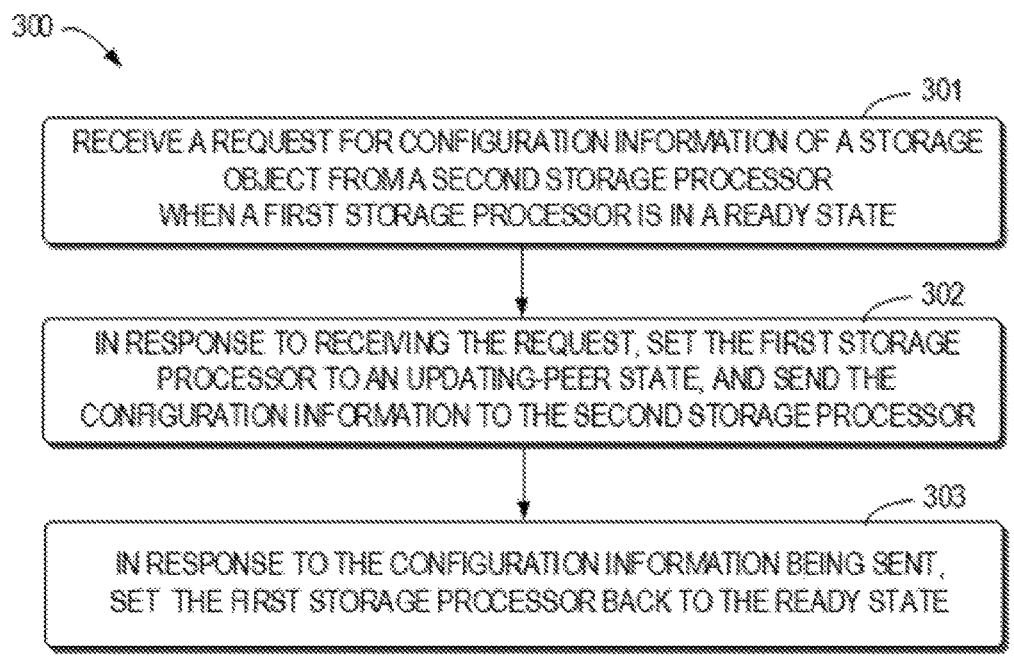
FIG. 3 illustrates a flowchart of a method 300 of maintaining data consistency according to an exemplary embodiment of the present disclosure.

FIG. 3 illustrates a flowchart of a method 300 of maintaining data consistency according to embodiments of the present disclosure. Hereinafter, steps in FIG. 3 will be described with reference to FIG. 1 and FIG. 2. The method 300 may be performed by SP 101 (i.e., active SP) in FIG. 1.

According to embodiments of the present disclosure, before executing step 301, SP 101 reads configuration information of a storage object from shared disk array 103, creates a topology of a storage object corresponding to the configuration information, and in response to the topology being created, sets SP 101 to the Ready state.

In step 301, when SP 101 is in the Ready state, a request for configuration information is received from SP 102. Then, method 300 proceeds to step 302. In step 302, in response to receiving the request, SP 101 is set to an Updating-Peer state, and configuration information is sent to SP 102 to maintain consistency of configuration information in SP 101 and SP 102. Then, method 300 proceeds to step 303. In step 303, in response to configuration information being sent, SP 101 is set back to the Ready state.

Figure 4:
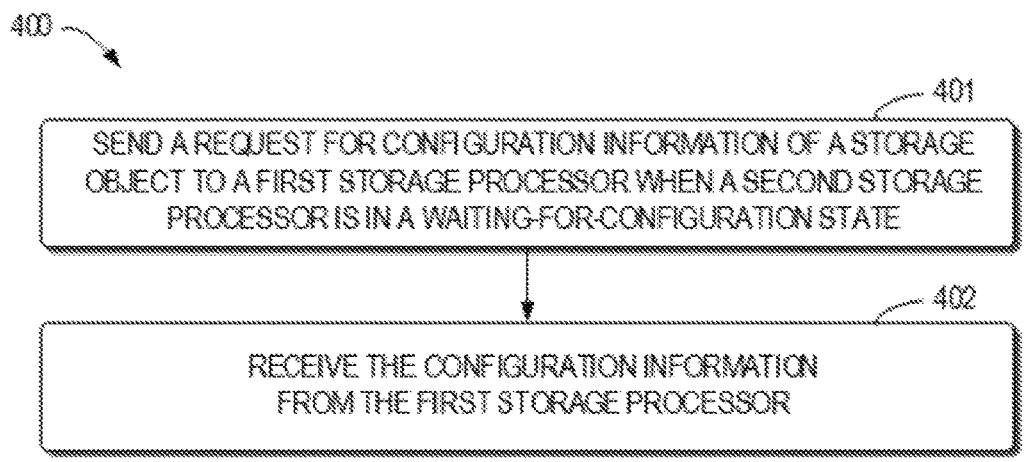
FIG. 4 illustrates a flowchart of a method 400 of maintaining data consistency according to an exemplary embodiment of the present disclosure.

FIG. 4 illustrates a flowchart of a method 400 of maintaining data consistency according to embodiments of the present disclosure. Hereinafter, the steps in FIG. 4 will be described with reference to FIG. 1 and FIG. 2. Method 400 may be executed by SP 102 (i.e., the passive SP) in FIG. 1.

In step 401, when SP 102 is in a Waiting-for-Configuration state, a request for configuration information of a storage object is sent to SP 101. Then, method 400 proceeds to step 402. In step 402, configuration information is received from SP 101, where configuration information in SP 102 is maintained consistent with that in SP 101.

According to embodiments of the present disclosure, method 400 may also include: in response to receiving the configuration information, creating a topology of the storage object corresponding to a configuration information. A further embodiment may include in response to a topology being created, setting SP 102 to a Ready state.

In one embodiment described above are procedures of reading configuration information from a shared storage device at booting stages of the two SPs. In a further embodiment, by virtue of the above methods, data consistency of configuration information in the two SPs and in a shared storage device can be ensured. In a further embodiment, during normal working period of a storage system, configuration information may need to be changed or re-created (e.g., creating a RG). In a further embodiment, for ease of depiction, FIG. 5 will be referenced below to describe how to ensure data consistency of configuration information in the two SPs and a shared storage device when configuration information is being changed. According to embodiments of the present disclosure, a procedure of re-creating configuration information may be similar to a procedure of changing configuration information, which will not be further described in detail.

Figure 5:
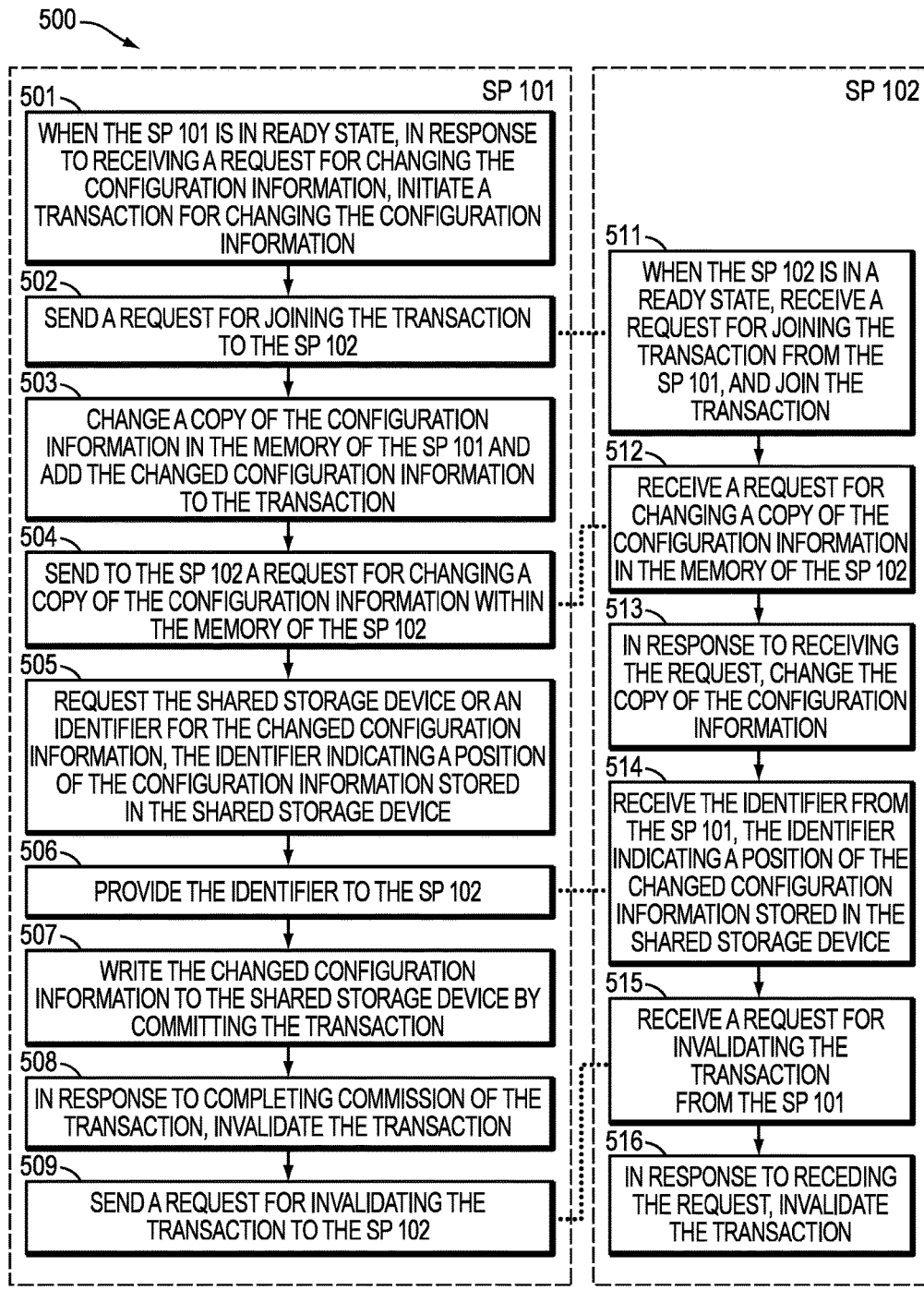
FIG. 5 illustrates a flowchart of a method 500 of maintaining data consistency according to an exemplary embodiment of the present disclosure.

FIG. 5 illustrates a flowchart of a method 500 of maintaining data consistency according to embodiments of the present disclosure. Hereinafter, respective steps of method 500 will be described with reference to FIG. 1. For ease of discussion, two SPs (i.e., SP 101 and SP 102) will be described concurrently. It should be noted that in FIG. 5, respective steps at the left side are executed by SP 101, while respective steps at the right side are executed by SP 102.

In step 501, when a state of SP 101 is in a Ready state, in response to receiving a request for changing the configuration information, a transaction for changing configuration information will be initiated by SP 101. Then, in step 502, a request for joining the transaction is sent to SP 102.

Correspondingly, in step 511, when a state of SP 102 is in a Ready state, a request for joining a transaction is received from SP 101, and the transaction is joined.

Then, the method proceeds to step 503. In step 503, SP 101 changes a first copy of configuration information in its memory (for example, configuration information in database entries within the memory of SP 101) and adds a changed configuration information to the transaction. Then, in step 504, a request is sent to SP 102 for changing a second copy of configuration information within the memory of SP 102.

Correspondingly, in step 512, SP 102 receives a request for changing the copy of configuration information in the memory of SP 102. Then, in step 513, in response to receiving the request, the copy of the configuration information is changed. For example, SP 102 may change the configuration information in the corresponding database entries within its memory.

Then, the method proceeds to step 505. In step 505, SP 101 requests a shared storage device for an identifier (ID) for the changed configuration information, the identifier indicating a position of configuration information stored in the shared storage device. For example, SP 101 may request a database entry ID for the changed configuration information from shared disk array 103. Then, in step 506, the identifier is provided to SP 102.

Correspondingly, in step 514, SP 102 receives the identifier from SP 101, the identifier indicating a position of the changed configuration information stored in the shared storage device. For SP 102, it is essential to know the position where SP 101 attempts to store the changed configuration information in the shared storage device. As will be detailed further hereinafter, when SP 101 has no response, SP 102 has to know the information so as to continue the transaction or rollback the transaction (i.e., go back to the state before executing the transaction).

Then, the method proceeds to step 507. In step 507, SP 101 writes the changed configuration information to the shared storage device by committing the transaction so as to maintain consistency of the configuration information in SP 101, SP 102, and shared disk array 103. According to embodiments of the present disclosure, before committing the transaction, a journal may be written for the database entry that is desired to be stored in the disk. After a journal body (data in an entry) is written, a journal head is set as valid (e.g., a certain specific value) to ensure that any IO on the disk is transactional; while the journal head is set as invalid after committing the transaction. As such, upon powering off or system panic, incomplete data will not be left on the disk.

Then, the method proceeds to step 508. In step 508, in response to completing the commission of the transaction, SP 101 invalidates the transaction. Then, in step 509, a request for invalidating the transaction is sent to SP 102.

Correspondingly, in step 515, SP 102 receives a request for invalidating the transaction from SP 101. Then, in step 516, in response to receiving the request, the transaction is invalidated.

According to embodiments of the present disclosure, a transaction state may be defined to synchronize behaviors between the two SPs. In a further embodiment, a transaction state may include: an Active state, a Ready-to-Commit state, an Invalid state, and a Rollback state. In a further embodiment, an active SP (i.e., SP 101 in FIG. 1) starts a transaction and synchronizes an operation to a passive SP (i.e., SP 102 in FIG. 1). In a further embodiment, a transaction state becomes an Active state, indicating that change to configuration information (e.g., a database entry) may be received. In a further embodiment, after all of operations are completed and joined into a transaction, an active SP may need to allocate an identifier to each database entry and synchronize an identifier to a passive SP. In a further embodiment, a passive SP sets a transaction state to be a Ready-to-Commit state. In a further embodiment, after an active SP writes data into a disk, the active SP may invalidate a transaction and synchronize an action to a passive SP, such that the passive SP sets the transaction state as invalid.

Return to FIG. 1, according to embodiments of the present disclosure, suppose both SPs (i.e., SP 101 and SP 102) are booting up, SP 101 (i.e., the active SP) becomes panic (i.e., having no response) before its database service state becomes the Ready state, then SP 102 may act as the active SP. In a further embodiment, if a database service state of SP 102 has not reach the Ready state yet, then SP 102 will directly load configuration information from shared disk array 103, create a topology of storage objects with configuration information, and then set its database service state to be the Ready state.

According to embodiments of the present disclosure, suppose SP 101 (i.e., active SP) becomes panic when a database service states of both SPs (i.e., SP 101 and SP 102) are in the Ready state, SP 102 will act as the active SP. In a further embodiment, if a transaction is modifying a database service entry, then the transaction may be affected by an SP failover. In a further embodiment, SP 102 needs to check a transaction state and a database journal. In a further embodiment, if necessary, SP 102 needs to continue the transaction or rollback the transaction.

Figure 6:
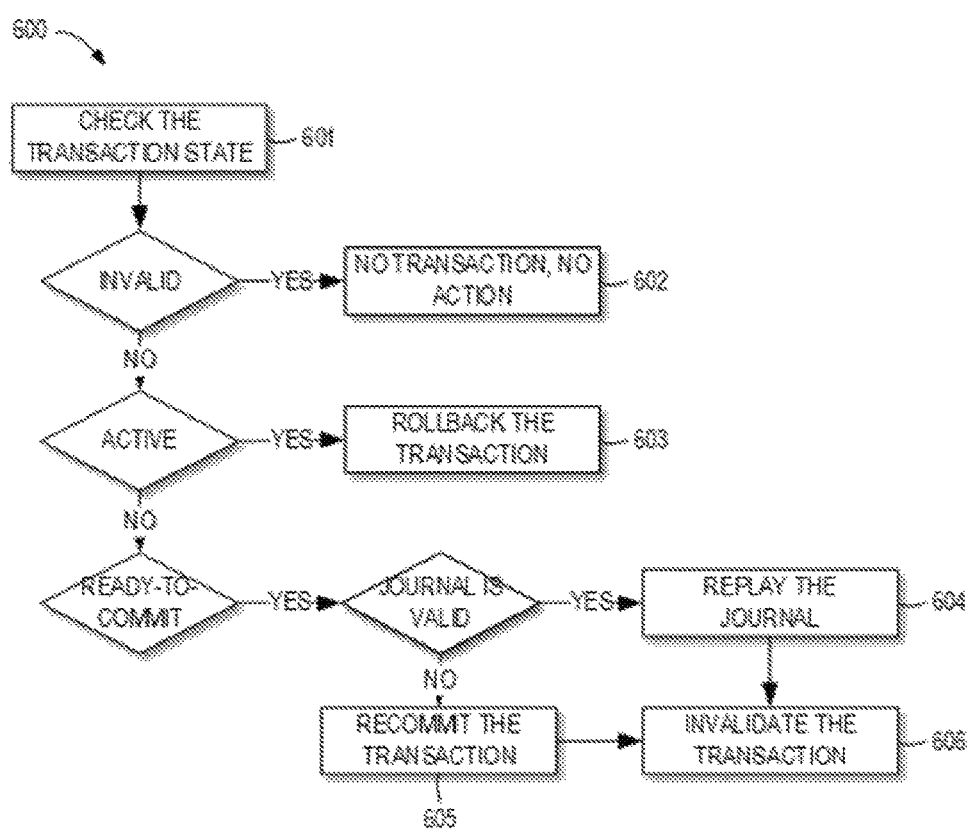
FIG. 6 illustrates a flowchart of a method 600 regarding how to determine an action on an in-flight transaction when a failover occurs to a storage processor according to an exemplary embodiment of the present disclosure.

FIG. 6 illustrates a flowchart of a method 600 regarding how to determine an action on an in-flight transaction when a failover occurs to a storage processor according to the embodiments of the present disclosure. As shown in FIG. 6, when an active SP becomes panic such that the passive SP acts as the active SP, the passive SP (for the sake of clarity, referred to as the current SP hereinafter) will check the transaction state (step 601). If the transaction does not exist (e.g., the transaction is in an Invalid state), no action will be taken (step 602). If the transaction is in the Active state, it means a peer SP (i.e., the active SP that has become panic) has started the transaction, but the transaction has not been completed yet. In this case, a current SP may rollback the transaction (step 603); in this case, no data on the disk need to be handled, because no operation on the disk occurred before the failover. If the transaction is in a Ready-to-Commit state, it means a peer SP has completed all of the operations and obtained all of the entry identifiers. In addition, a current SP has been synchronized with all of the required data. In this case, a current SP needs to check a database journal. If the journal is valid, replay the journal and complete the transaction (step 604); if the log is invalid, re-commit the transaction (step 605), because the original active SP has completed writing data into the disk and has invalidated the journal.

Figure 7:
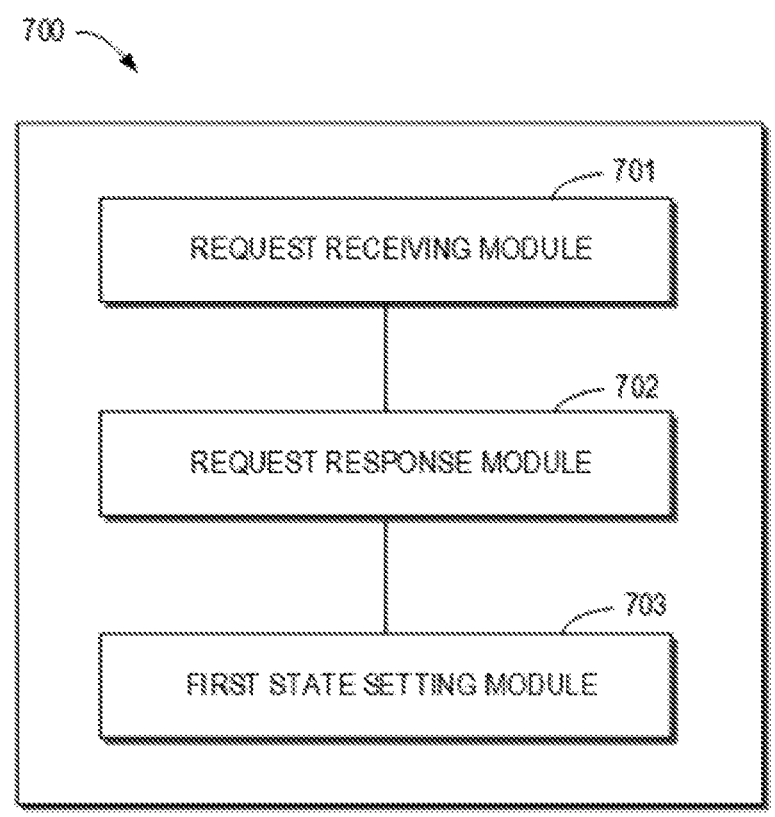
FIG. 7 illustrates a block diagram of an apparatus 700 for maintaining data consistency according to an exemplary embodiment of the present disclosure.

FIG. 7 illustrates a block diagram of an apparatus 700 for maintaining data consistency according to the embodiments of the present disclosure. SP 101 (i.e., the active SP) in FIG. 1 can be implemented as apparatus 700. Apparatus 700 includes: request receiving module 701 configured to receive a request for configuration information of a storage object from a second storage processor when apparatus 700 is in a Ready state; request response module 702 configured to, in response to receiving the request, set apparatus 700 to an Updating-Peer state, and send configuration information to the second storage processor to maintain consistency of configuration information in th apparatus 700 and the second storage processor; and first state setting module 703 configured to, in response to configuration information being sent, set the state back to the Ready state.

In a further embodiment, apparatus 700 may further include: a configuration reading module that may be configured to read configuration information from a shared storage device. In a further embodiment apparatus 700 may include a topology creating module that may be configured to create a topology of a storage object corresponding to configuration information. In a further embodiment apparatus 700 may include a second state setting module configured to, in response to a topology being created, set a first storage processor to a Ready state. In a further embodiment, apparatus 700 further includes: a transaction initiating module that may be configured to, in response to receiving a request for changing configuration information after a first storage processor is set back to a ready state, initiate a transaction for changing configuration information. In a further embodiment apparatus 700 may include a first request sending module configured to send a request for joining in a transaction to a second storage processor.

In a further embodiment, apparatus 700 further includes: a configuration changing module that may be configured to change a first copy of configuration information in a first memory of the apparatus. In a further embodiment apparatus 700 may include a transaction adding module that may be configured to add changed configuration information to a transaction. In a further embodiment apparatus 700 may include a second request sending module that may be configured to send to a second storage processor a request for changing a second copy of configuration information in a second memory of second storage processor. In a further embodiment, apparatus 700 further includes: an identifier requesting module that may be configured to request an identifier for changed configuration information from a shared storage device, the identifier indicating a position of the configuration information stored in the shared storage device, In a further embodiment apparatus 700 may include an identifier providing module that may be configured to provide the identifier to the second storage processor. In a further embodiment, apparatus 700 further includes: a transaction committing module that may be configured to write changed configuration information to a shared storage device by committing a transaction to maintain consistency of a configuration information in the apparatus, a second storage processor, and a shared storage device. In a further embodiment, apparatus 700 further includes: a transaction invalidating module that may be configured to in response to completing a commission of a transaction, invalidate the transaction. In a further embodiment apparatus 700 may include a third request sending module that may be configured to send a request for invalidating a transaction to a second storage processor.

Figure 8:
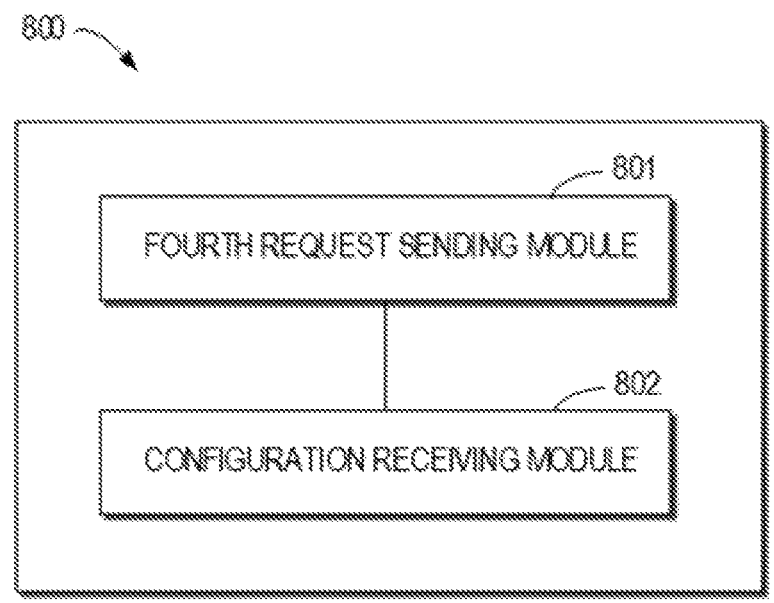
FIG. 8 illustrates a block diagram of an apparatus 800 for maintaining data consistency according to an exemplary embodiment of the present disclosure.

FIG. 8 illustrates a block diagram of an apparatus 800 for maintaining data consistency according to embodiments of the present disclosure. SP 102 (i.e., the passive SP) in FIG. 1 can be implemented as apparatus 800. Apparatus 800 may include: fourth request sending module 801 that may be configured to send a request for configuration information to a first storage processor when apparatus 800 is in a Waiting-for-Configuration state. In a further embodiment apparatus 800 may include configuration receiving module 802 that may be configured to receive configuration information from a first storage processor, the configuration information in apparatus 800 being maintained consistent with configuration information in a first storage processor.

For the sake of clarity, FIGS. 7 and 8 do not show some optional modules of apparatuses 700 and 800. However, it should be understood that respective features described with reference to the methods of the present disclosure are also suitable for apparatuses 700 and 800. Moreover, respective modules in apparatuses 700 and 800 may be hardware modules or software modules. For example, in some embodiments, apparatuses 700 and 800 may be implemented partially or fully with software and/or firmware, e.g., implemented as a computer program product embodied on a computer readable medium. Alternatively or additionally, apparatuses 700 and 800 may be implemented partially or fully based on hardware, e.g., implemented as an integrated circuit (IC), an application-specific integrated circuit (ASIC), a system on chip (SOC), a field programmable gate array (FPGA), etc. The scope of the present disclosure is not limited in this aspect.

Figure 9:
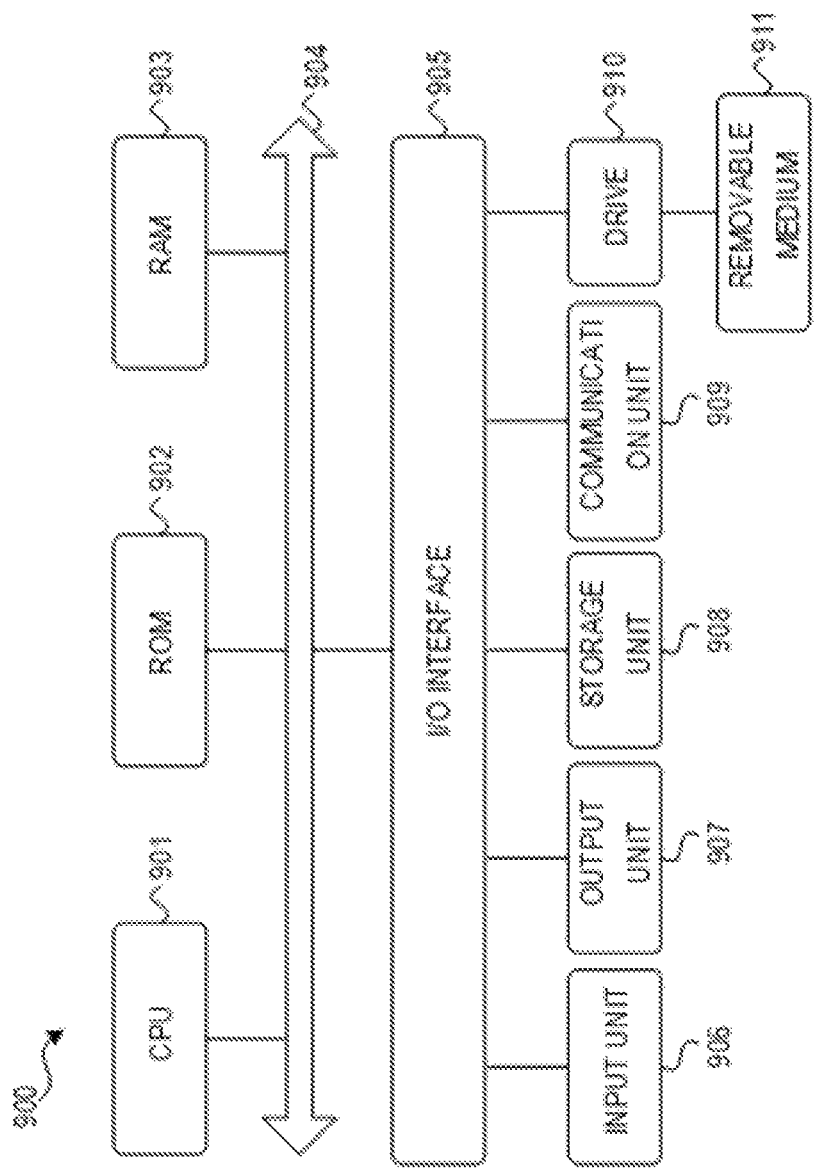
FIG. 9 illustrates a block diagram of a computer system 900 adapted to implementing exemplary embodiments of the present disclosure.

Hereinafter refer to FIG. 9, in which a block diagram of a computer system 900 adapted to implementing exemplary embodiments of the present disclosure is presented. As shown in FIG. 9, the computer system may comprise central processing unit (CPU) 901 that may perform various appropriate actions and processing based on a program stored in read-only memory (ROM) 902 or a program loaded from storage section 908 to random access memory (RAM) 903. RAM 903, further store various programs and data needed for operations of apparatus 700 and/or apparatus 800. CPU 901, ROM 902 and RAM 903 are connected to each other via bus 904. Input/output (I/O) interface 905 is also connected to bus 904.

The following components are connected to I/O interface 905: an input part including a keyboard, a mouse and the like; an output part 907 including a cathode ray tube (CRT), a liquid crystal display (LCD) and a loudspeaker, etc.; memory part 908 including a hard disk, etc.; communication part 909 including a network interface card such as LAN card, model, etc. Communication part 909 performs communication processing via a network such as Internet. Drive 910 may also be connected to I/O interface 905 as needed. Removable medium 911, such as a magnetic disk, an optic disk, a magneto-optical disk, a semiconductor memory, and the like, is mounted on drive 910 as required, such that a computer program read therefrom is mounted in storage part 908 as required.

In particular, according to embodiments of the present disclosure, method 300 described with reference to FIG. 3, method 400 described with reference to FIG. 4, method 500 described with reference to FIG. 5, and/or method 600 described with reference to FIG. 6 may be implemented as computer software programs. For example, embodiments of the present disclosure include a computer program product that is tangibly stored on a non-transient computer-readable medium and includes computer-executable instructions, the computer-executable instructions, when being executed, cause the computer to execute steps of methods 300, 400, 500, and/or 600.

In view of the above, according to embodiments of the present disclosure, there is provided a method and apparatus of maintaining data consistency. Embodiments of the present disclosure can be implemented in an architecture that has one or more storage processors and a shared storage device, so as to ensure data consistency between copies of the data in the one or more storage processors and the shared storage device.

Embodiments of the present disclosure may be a method, an apparatus and/or a computer program product. A computer program product may include a computer readable storage medium (or media) having computer readable program instructions thereon for causing a processor to carry out aspects of the present invention.

A computer readable storage medium can be a tangible device that can retain and store instructions for use by an instruction execution device. A computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. A network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. A computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

A computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Flowcharts and block diagrams illustrate the architecture, functionality, and operation of possible implementations of systems, methods and computer program products according to various embodiments of the present invention. In this regard, each block in the flowchart or block diagrams may represent a module, snippet, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method of maintaining data consistency, the method comprising:
    receiving, when a first storage processor is in a Ready state, a request for configuration information of a storage object from a second storage processor;
    in response to receiving the request,
        setting the first storage processor to an Updating-Peer state, and
        transmitting the configuration information to the second storage processor to maintain consistency of the configuration information in the first and second storage processors;
    in response to the configuration information being transmitted, setting the first storage processor back to the Ready state;
    reading, by the first storage processor, the configuration information from a shared storage device;
    creating a topology of the storage object corresponding to the configuration information;
    in response to the topology being created, setting the first storage processor to the Ready state;
    in response to receiving a request for changing the configuration information after the first storage processor is set back to the ready state, initiating a transaction for changing the configuration information by the first storage processor;
    transmitting a request for joining the transaction to the second storage processor;
    changing a first copy of the configuration information in a first memory of the first storage processor;
    adding the changed configuration information to the transaction; and
    transmitting to the second storage processor a request for changing a second copy of the configuration information in a second memory of the second storage processor;
    requesting, by the first storage processor, an identifier for the changed configuration information from the shared storage device, the identifier indicating a position of the configuration information stored in the shared storage device; and
    providing the identifier to the second storage processor.

2. The method according to claim 1, further comprising:
    writing the changed configuration information to the shared storage device by committing the transaction to maintain consistency of the configuration information in the first storage processor, the second storage processor and the shared storage device.

3. The method according to claim 2, further comprising:
in response to completing the commission of the transaction, invalidating the transaction by the first storage processor; and
transmitting a request for invalidating the transaction to the second storage processor.

4. A method of maintaining data consistency, the method comprising:
sending a request for configuration information of a storage object to a first storage processor when a second storage processor is in a Waiting-for-Configuration state;
receiving the configuration information from the first storage processor, the configuration information in the second storage processor being maintained consistent with the configuration information in the first storage processor;
in response to receiving the configuration information, creating a topology of the storage object corresponding to the configuration information;
in response to the topology being created, setting the second storage processor to a Ready state;
when the second storage processor is in the Ready state, receiving from the first storage processor a request for joining a transaction, the transaction being used to change the configuration information;
in response to receiving the request, joining the transaction;
receiving, from the first storage processor, a request for changing a copy of the configuration information within a memory of the second storage processor;
in response to receiving the request, changing the copy of the configuration information within the memory of the second storage processor; and
receiving, from the first storage processor, an identifier for the changed configuration information, the identifier indicating a position of the changed configuration information stored in the shared storage device.

5. The method according to claim 4, further comprising:
receiving, from the first storage processor, a request for invalidating the transaction; and
in response to receiving the request, invalidating the transaction.

6. The method according to claim 4, further comprising:
in response to determining that the first storage processor has no response, the second storage processor taking on the role of the first storage processor.

7. An apparatus of maintaining data consistency, configured to receive, when the apparatus is in a Ready state, a request for configuration information of a storage object from a second storage processor;
in response to receiving the request,
set the apparatus to an Updating-Peer state, and
transmit the configuration information to the second storage processor to maintain consistency of the configuration information in the apparatus and the second storage processor;
a first state setting module configured to, in response to the configuration information being sent, set the state back to the Ready state;
read the configuration information from a shared storage device;
create a topology of the storage object corresponding to the configuration information;
in response to the topology being created, set the first storage processor to the Ready state;
in response to receiving a request for changing the configuration information after the first storage processor is set back to the ready state, initiate a transaction for changing the configuration information;
transmit a request for joining in the transaction to the second storage processor;
change a first copy of the configuration information in a first memory of the apparatus;
add the changed configuration information to the transaction;
transmit to the second storage processor a request for changing a second copy of the configuration information in a second memory of the second storage processor;
request an identifier for the changed configuration information from the shared storage device, the identifier indicating a position of the configuration information stored in the shared storage device;
provide the identifier to the second storage processor.

8. The apparatus according to claim 7, further configured to:
write the changed configuration information to the shared storage device by committing the transaction to maintain consistency of the configuration information in the apparatus, the second storage processor, and the shared storage device.

* * * * *